July 8, 1969  E. W. CURTZE ET AL  3,454,219

METHOD AND APPARATUS FOR SEVERING GLASS SHEETS

Original Filed Oct. 4, 1966  Sheet 1 of 2

INVENTORS
EDWARD W. CURTZE
GEORGE O. WEHNER
JOHN N. BARSOM

United States Patent Office 3,454,219
Patented July 8, 1969

3,454,219
METHOD AND APPARATUS FOR SEVERING GLASS SHEETS
Edward W. Curtze, Pittsburgh, George O. Wehner, Bethel Park, and John M. Barsom, Pittsburgh, Pa., assignors to PPG Industries, Inc., Pittsburgh, Pa., a corporation of Pennsylvania
Original application Oct. 4, 1966, Ser. No. 584,145, now Patent No. 3,398,868. Divided and this application Mar. 18, 1968, Ser. No. 713,603
Int. Cl. B26f 3/00
U.S. Cl. 225—1                     1 Claim

ABSTRACT OF THE DISCLOSURE

A method of severing a scored glass sheet comprising supporting the sheet on a first pair of supports, contacting the unsupported surface by a second pair of contacting means and applying pressure to the glass surface to provide a uniform bending moment about said score line.

---

This application is a division of our then co-pending application Serial No. 584,145, filed October 4, 1966, now U.S. Patent No. 3,398,868.

This application relates to an improved method of severing glass.

In the prior art, one method of severing glass was to use what is known as a "snap roll." A scored sheet of glass is run down a suitable conveyor, and when the center line of the upwardly rising snap roll is in alignment with the score line, the glass is struck a quick blow and severed.

The prior art practice required that the center line of the snap roll and the score line of the glass be synchronized in their positions, so that they are coincident at the time of the contact.

The distribution of moments about a score line in an annealed glass plate has a great influence on the quality of the cut edge. It has been demonstrated that one of the conditions for ideal cutting is a symmetric moment distribution about the score line. The prior art mechanical cutting methods and apparatus provide only a single line as a fulcrum, and that line or point must coincide with the roll on which the glass was severed. Due to a variation of up to 30 per cent in the forces required to open similar score lines, and due to the difficulties of timing the activated roll so that the instant of impact corresponds exactly when the score line is located at the center of the activated roll, it is extremely difficult, and sometimes impossible, to produce symmetric moments at the instant of severing.

Applicants' invention is an improved snapping method which eliminates the necessity of having to simultaneously line up the score line and the center line of the snap roll. Applicants' apparatus applies a constant bending moment about a score line while the score is positioned over a wide range relative to the snapping rolls. Hence, this apparatus is termed a "constant moment snapper."

Referring to the drawing.

A top roll assembly may be made of component parts as follows. Each side of a top assembly is a duplicate of the other. Therefore, a detailed description of one typical construction will be given.

A side frame 15 is fastened to a cross piece 14. A rocker arm 19 is attached to side frame. A pivot joint, or pin, 17 provides a pivotal connection between the side frame and each rocker arm.

Figure 1:
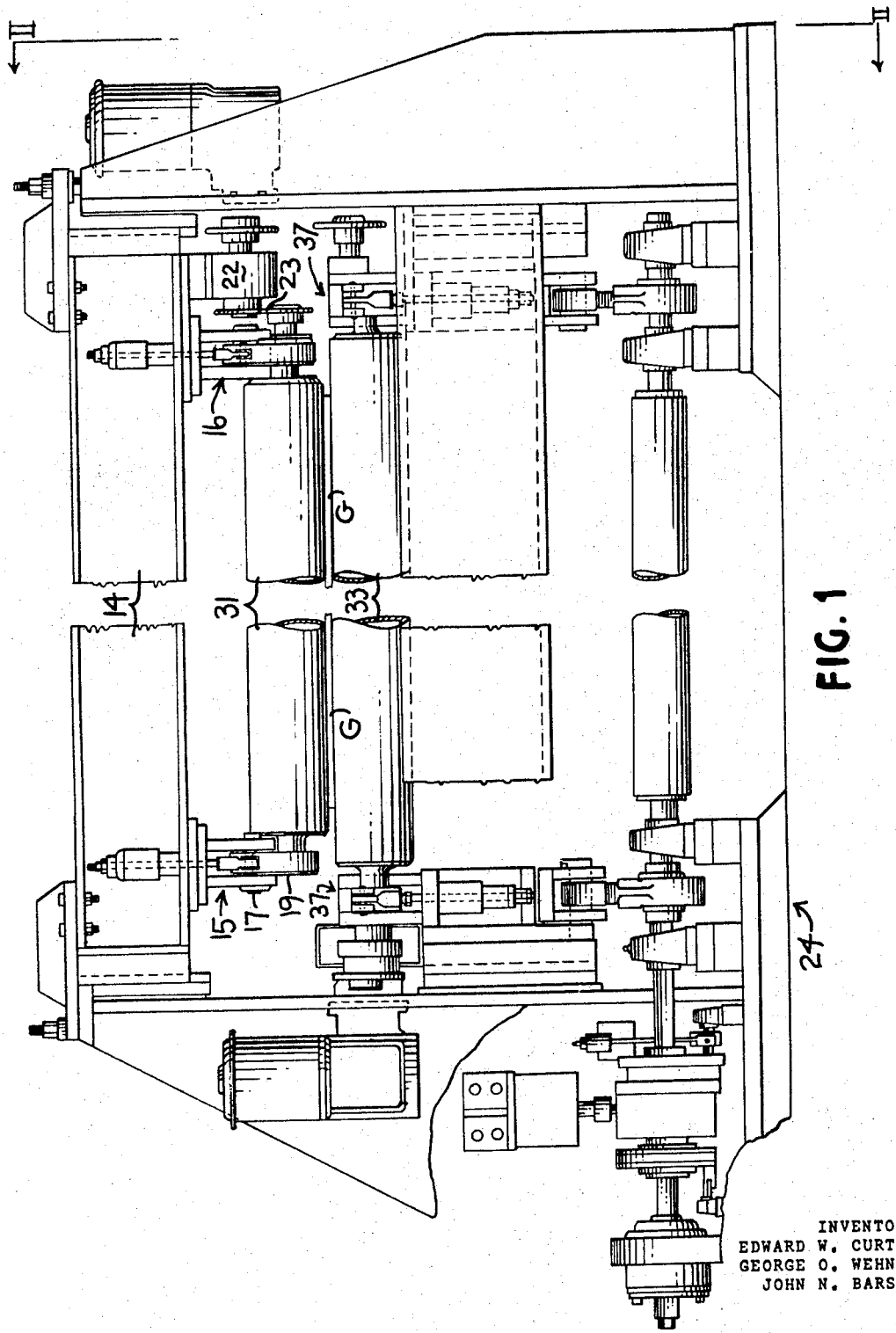
FIG. 1 is a semi-schematic end view of both the upper and lower snap rolls, showing the relation of the roll assembly, the activiating mechanism and support assembly.

A pair of glass contacting rolls 30 and 31 are positioned between two side frames 15 and 16, and span a suitable glass conveying table (not shown) and, of course, spanning a piece of glass as shown in FIG. 1. The rolls 30 and 31 are driven by any suitable means, such as a motor 22 and a sprocket chain 23. The rolls rotate at about the speed of glass travel to insure that no marring or scratching occurs during contact with the glass. A pair of springs 25 and 26 provide a dampening effect on the rocker arm.

Figure 2:
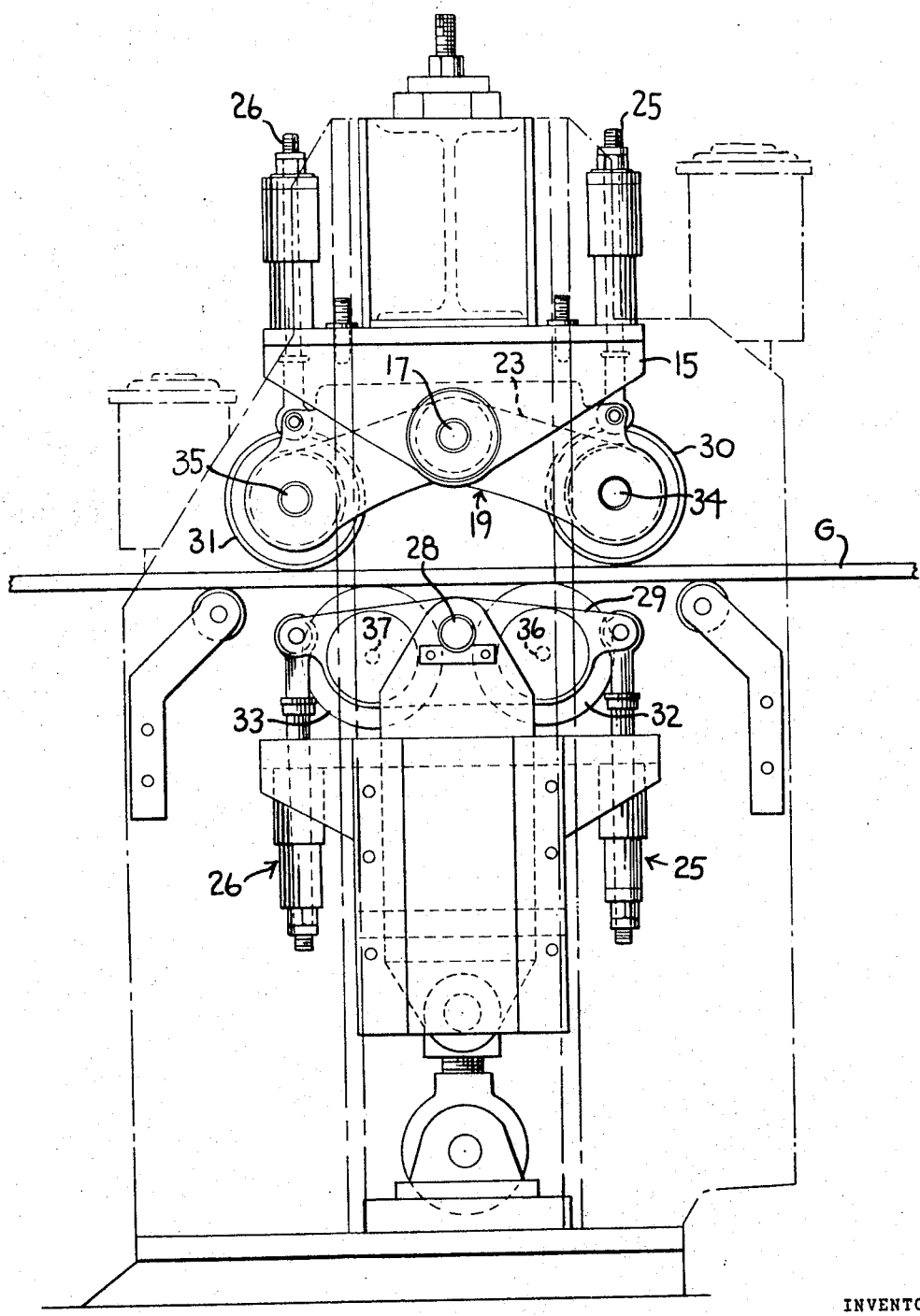
FIG. 2 is a side view of the snap roll section, with the glass travelling into and through the roll.

FIG. 2 is an illustration from a side view showing the position of the top and bottom support assembly in relationship to one another.

A bottom supporting assembly has a pair of side plates 37 in spaced relationship across a conveyor. A rocker arm 29 is pivotally attached to a side plate by a pivot pin 28. A pair of glass contacting rolls 30 and 31 are rotatably mounted to the rocker arm, and span a glass sheet to be severed.

It is obvious that the distance between pivot points 34 and 35 may be increased to quite a distance and the corresponding distance between pivot points 36 and 37 may also be increased. It is necessary, however, that the distance between points 36 and 37 be less than the distance between points 34 and 35. The distance between the rotatable mounting of the snap rolls 34 and 35 and their corresponding pivot points, i.e., 17, must be equal as the distance between points 36, 37 and 28 must be equal. With this arrangement of pivots and rolls, it is possible to apply a uniform bending moment over a relatively long distance between points 36 and 37 as the glass travels between pivot points 37 and 36.

In operation, a sheet of glass is brought down any suitable conveyor line, and a score is imposed on a surface of the glass by any known scoring means. The glass to be severed proceeds into the severing apparatus until the score line is positioned between the two opposing pairs of snap rolls. In response to a signal or command, one pair of rolls is moved inwardly, applying pressure to the surface of the glass, and resulting in a uniform bending moment about the score line regardless of the position of the score line relative to the snap rolls.

It is obvious that other embodiments of this invention are contemplated, i.e., that the top and bottom snap rolls may be mounted in a position for snapping glass as it travels perpendicular to the horizontal, such as utilized in a window glass drawing machine with the corresponding scored and laydown apparatus.

It is particularly adapted to cutting large continuous sheets where the bending moment about the score line is quite large due to the long distance involved between the ribbon of glass as it leaves the drawing machine and goes up through the lehr to the cutting apparatus.

One device for sensing a score, such as a light detector, etc., may be used to detect the oncoming score in the glass. Any suitable actuating means may be used to trigger a power means to move the appropriate roll assembly against the glass.

Any time after the score line is between rolls 30 and 31, for example, the rolls are contacted to the glass and the pressure rolls 30 and 31 against 34 and 35 produce a constant moment bending insuring a uniform separation of the glass along the score.

What we claim is:
1. A method of severing a scored glass sheet along said score line comprising:
(a) supporting said scored sheet on a first pair of spaced rotatable cylindrical glass contacting means;

(b) positioning said contacting means relative to said glass by pivotally mounting said means so that said glass contacting means may contact said glass in any plane by rotating about said pivot;

(c) contacting a second surface of said glass with a second pair of spaced rotatable cylindrical contacting means, said second pair of spaced contacting means being positioned at a greater distance from each other then said first pair of contacting means;

(d) pivotably positioning said second contacting means relative to said glass sheet so that said contacting means is pivotable about said pivot while contacting said glass sheet in any plane;

(e) moving said contacting means relative to said second means to apply a uniform bending moment to sever said glass along said score line.

References Cited

UNITED STATES PATENTS

| | | | |
|---|---|---|---|
| 3,142,427 | 7/1964 | Brand | 225—104 |
| 3,300,112 | 1/1967 | Tailleur et al. | 225—96.5 |

JAMES M. MEISTER, *Primary Examiner.*

U.S. Cl. X.R.

225—2, 96.5